INVENTOR.
ORIN H. ALLMAN

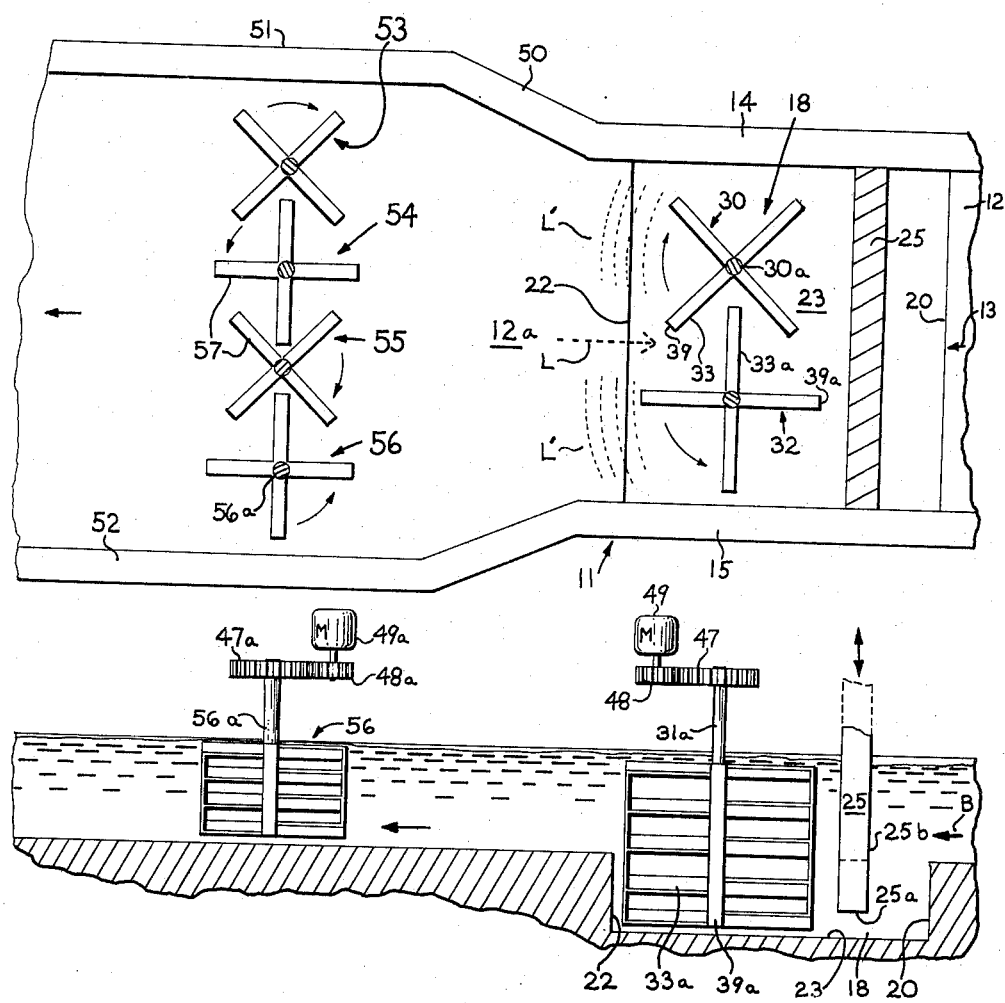

Feb. 22, 1966     O. H. ALLMAN     3,236,618
GLASS STIRRING APPARATUS
Filed March 15, 1963     4 Sheets-Sheet 3
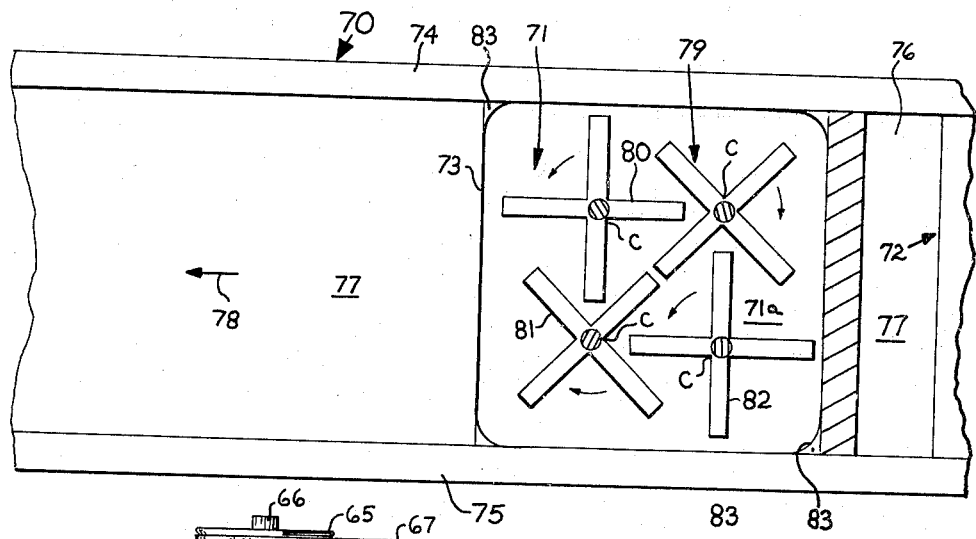
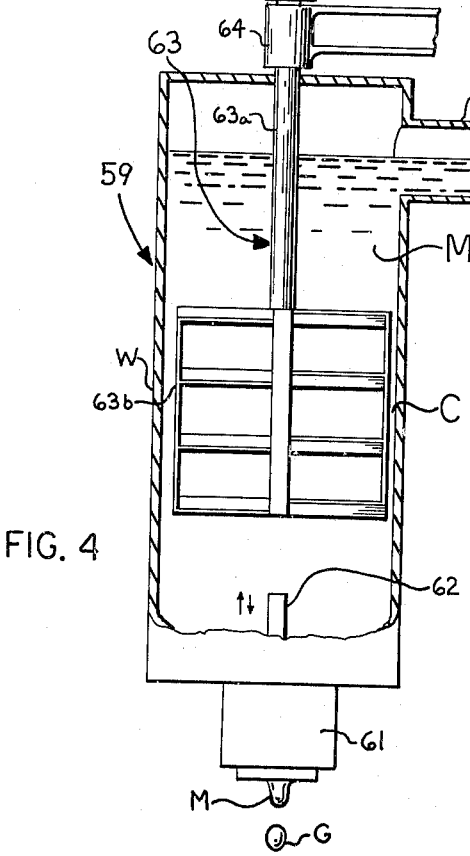
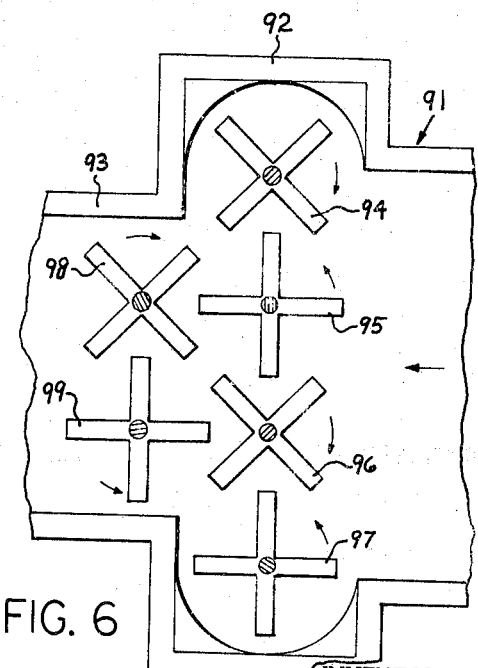
FIG. 5
FIG. 4
FIG. 6
INVENTOR.
ORIN H. ALLMAN
BY
ATTORNEYS Feb. 22, 1966   O. H. ALLMAN   3,236,618
GLASS STIRRING APPARATUS
Filed March 15, 1963   4 Sheets-Sheet 4
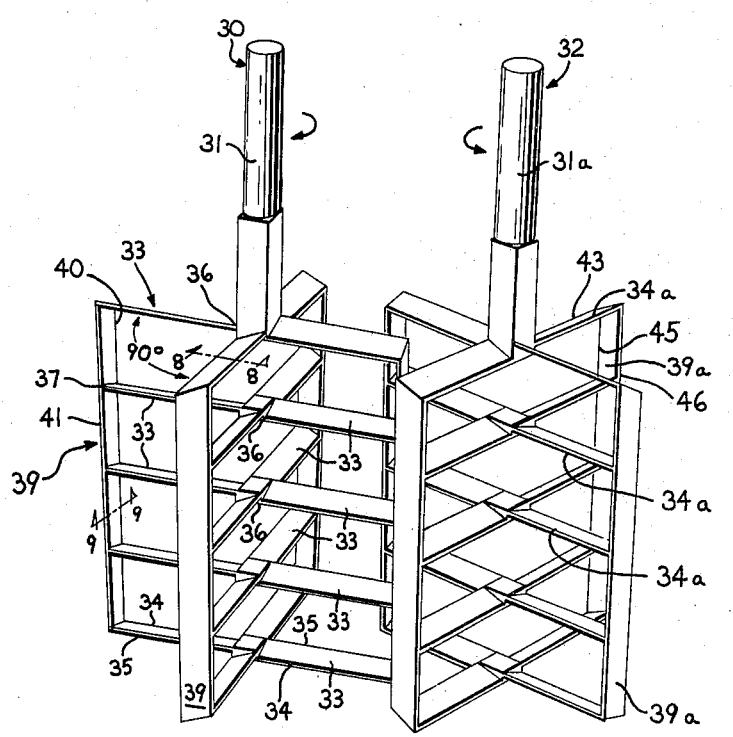
FIG. 7
FIG. 8
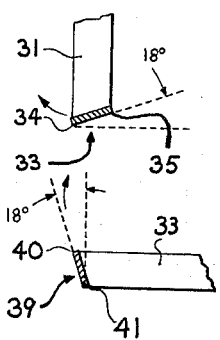
FIG. 9
INVENTOR.
ORIN H. ALLMAN
BY
ATTORNEYS

United States Patent Office 3,236,618
Patented Feb. 22, 1966

3,236,618
GLASS STIRRING APPARATUS
Orin H. Allman, Toledo, Ohio, assignor to Owens-Illinois Glass Company, a corporation of Ohio
Filed Mar. 15, 1963, Ser. No. 265,402
9 Claims. (Cl. 65—178)

The present invention relates to the art of manufacturing glass. More particularly, the invention relates to the mixing, stirring and/or blending of molten glass as it passes in continuous fashion through a vessel, such as a forehearth, channel, or the like.

Molten glass is subjected to mixing or blending for a variety of reasons. Thus, it is known that molten glass proceeding from the furnace or melter usually contains observable discontinuities or inhomogeneities, which defects are commonly referred to in the art as seeds, stones, striae, mares tails, etc. Such defects are caused, for example, by impurities, improper formulations, and the like. These stones, cords, etc., if not removed or dissipated, are carried over into the ultimately formed glass article, e.g., where they are most unsightly and, as a consequence, the article may be unmarketable. These defects may also constitute points, lines or zones of weakness which cannot be tolerated in many products. It has been suggested that these defects, e.g., cords, stones, etc., could be removed, dissipated or their effect reduced by the employment of certain stirring devices. One widely used stirrer has the shape of a large screw having an exaggerated spiral thread. The latter type of stirrer, depending upon the direction of angular rotation and the "hand" of the thread contour, serve to either lift the glass upwardly or force the glass downwardly. In actual operation these screw-type stirrer devices leave much to be desired, however, since the degree or amplitude of stirring is quite mild and, as a consequence, the efficiency is substantially below that which would be desired in order to effect a complete dissipation of the above-enumerated defects.

It is also desirable to stir or blend molten glass in which colorants have been incorporated in order to produce a "colored" glass. Stirring here is necessary to insure a uniformly colored glass. If the glass is not properly stirred, discontinuities in color intensity will result, leading to an unattractive and unmarketable product.

Glass is also desirably stirred or mixed in order to promote a uniform temperature throughout the continuously moving molten glass, and particularly at the outlet end since non-uniformity of temperature causes forming difficulties and frequently material defects in the finished ware.

It has also been found that the operations of stirrers known heretofore have been accompanied by the formation of undesirable vortex phenomena both upstream and downstream thereof. This has been found to be particularly true when they have been used in a spaced linear array or bank thereof.

With the foregoing general introduction into the environment in which the present invention resides, it may be stated that it is an object of the present invention to provide novel stirrer constructions, stirrer arrangements and installations which are operative on a stream of molten glass flowing in a channel to the end that the molten glass is remarkably free of deflects, such as stones, striae, cords, or other evidences of inhomogeneity.

It is another object of the present invention to provide a channel, forehearth and stirrer arrangement which co-acts in providing a more efficient stirring operation than has been known heretofore.

It is likewise an object of the present invention to provide a novelly designed stirrer element possessed of a dual functionality which, particularly where two or more of such elements are employed, is yieldative of the optimum in terms of homogenization of molten glass carried in a forehearth, channel, or the like.

It is still another object of the present invention to provide a variety of unique installation arrangements for the novel stirrer elements of the present invention, which arrangements are ideally suited to take advantage of the stirring function of the stirrer by reason of its features of construction and design.

It is likewise another object of the present invention to provide a stirrer construction and plural arrangement thereof in conjunction with special forehearth construction features whereby the formation of vortex phenomena is eliminated or substantially reduced.

The foregoing, as well as other objects of the present invention, will become apparent to those skilled in the art from the following detailed description taken in conjunction with the annexed sheets of drawings on which there is presented, for purposes of illustration only, several embodiments of the present invention.

In the drawings:

FIG. 2 is a top plan view of a channel or forehearth somewhat similar to that shown in FIG. 1, but including another feature in accordance with a further embodiment of the present invention.

FIG. 3 is a side elevation view of the channel construction shown in FIG. 2, but with the one wall broken away in order to show the relationship of the various components and to better show the flow of glass in its molten form.

FIG. 4 is a sectional view of a molten glass delivery chamber inclusive of a stirrer in accordance with an embodiment of the present invention.

FIG. 5 is a top plan view of a channel or forehearth containing an arrangement of stirrers of the present invention in accordance with a particular arrangement representing another embodiment of the present invention.

FIG. 6 is a top plan view of a forehearth construction for conveying molten glass therethrough; said forehearth including modifications and an array of the stirrers of the invention to therefor illustrate another embodiment of this invention.

FIG. 7 is a perspective view of a pair of the stirring devices in accordance with the preferred embodiment of the present invention, but in greatly enlarged form for purposes of better illustrating the details of construction.

FIG. 8 is a sectional view taken on the line 8—8 in FIG. 7.

FIG. 9 is a sectional view taken on the line 9—9 in FIG. 7.

Figure 1:
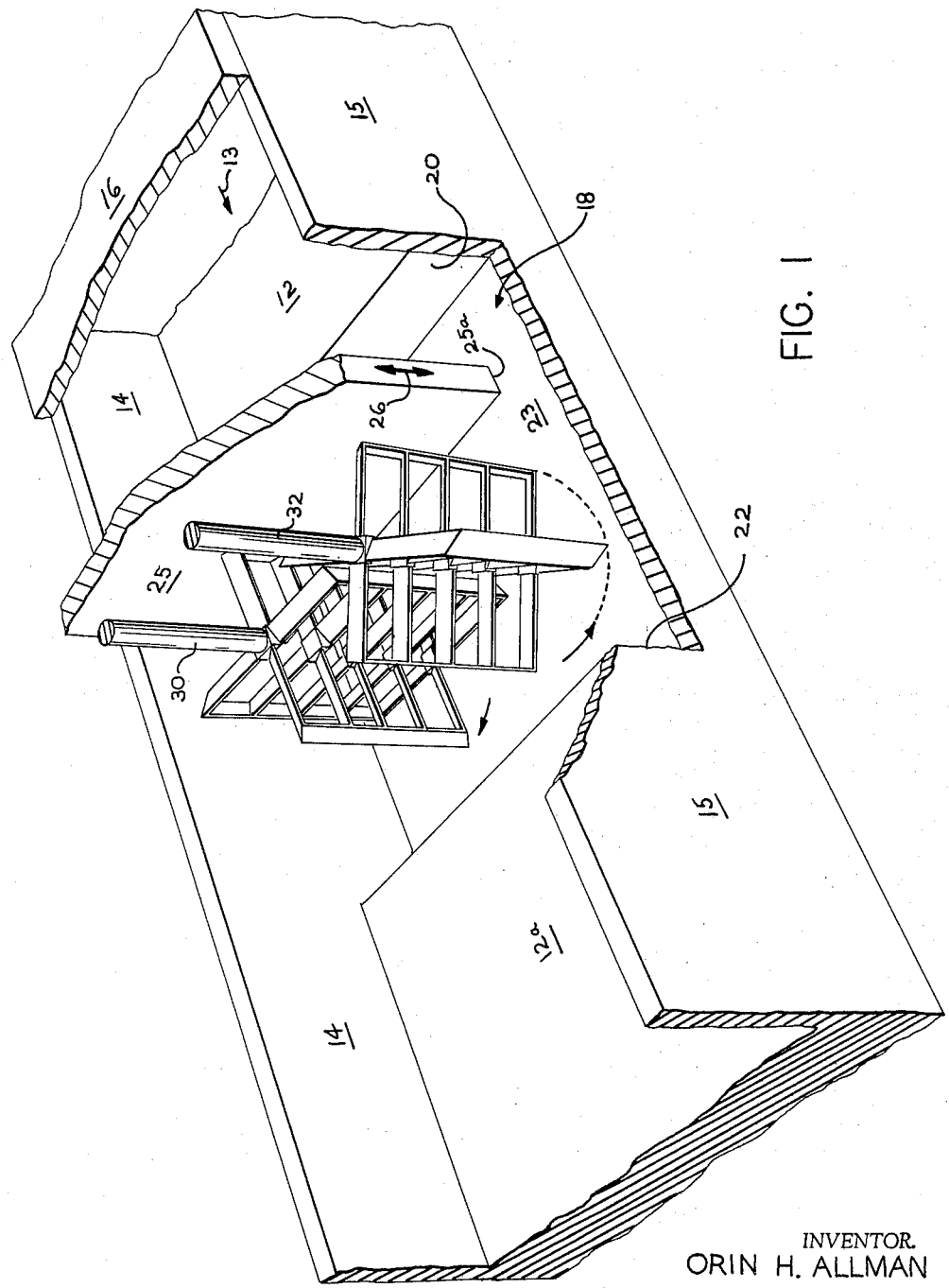
FIG. 1 is a perspective view, having portions broken away, of a channel inclusive of a stirring arrangement and channel construction in accordance with a preferred embodiment of the present invention.

In its most simple form, the present invention envisions a novel immersion stirrer for mixing molten glass as it passes through a forehearth, channel, or the like; said stirrer including a plurality of horizontally extending fins capable of urging the molten glass in an upward direction as the stirrer rotates; additionally, a plurality of vertically disposed deflectors carried by said fins capable of urging glass inwardly; said fins and deflectors being carried on a vertically disposed rotatable support shaft whereby rotation thereof causes effective displacement of the glass both vertically and laterally.

More specifically, the stirrer includes a plurality of fins which are arranged in vertically spaced flights, each flight being inclusive of a plurality of inclined fins extending radially from the vertical central axis for said flights; additionally, said stirrer including inclined deflectors connecting said fins and rotatable shaft means for effecting movement of said stirrer about central axis. The present invention also envisions and provides that an even plurality of the stirrer elements should be utilized preferably with spacing between stirrers and relative rotation, being selected so that the fins overlap or intermesh as it were as they rotate.

Additionally, the present invention envisions the employment of the stirrers in cooperative conjunction with a modified forehearth or channel construction which is inclusive of a depression or well, and a depending skimmer plate or bar feature whereby the molten glass conveyed is forced into a particular flow path which is conducive in conjunction with the employment of the stirrers of the invention to yield an optimum in stirring efficiency.

Other more specific details of construction involved in the preferred embodiments will be more apparent from the detailed description to follow.

Referring now more specifically to the drawings, there is shown in FIG. 1 a channel construction 11 which is defined by horizontal bottom wall sections 12 and 12a which lie in the same plane, but the section 12 being located on the right in a generally upstream direction with reference to the direction of flow of the molten glass (not shown) indicated by the arrow, identified by the reference numeral 13, while section 12a is on the left in a moreorless downstream direction. Connected to the bottom wall sections 12 and 12a are, respectively, a right hand side wall 14 and a left hand side wall 15, the designation "right" and "left" being used with reference to a view looking downstream. Roof or top wall 16 bridging across the said walls, in order to confine the heat, has been substantially broken away for purposes of clarity of illustration. In accordance with the invention the bottom wall 12a has been modified to include a well or sump 18 defined by the same side walls 14 and 15 as before but, additionally, by an upstream vertical face 20, and an aft or downstream face 22 and, additionally, a bottom wall section 23 which is spaced below the plane of the bottom wall sections 12 and 12a. A vertical refractory skimmer member 25 extends the distance between the side walls 14 and 15 and projects vertically downward into the sump 18 slightly downstream from the upstream face 20 of the well 23. The skimmer plate 25 is vertically adjustable as indicated by the arrow, identified by the reference numeral 26. No molten glass is shown in order to better show the features of construction but it will be appreciated that molten glass is intended to be carried in the channel and would normally occupy the channel to a depth indicated by the point designated by the reference numeral 27. The channel 11 is formed of heat insulative refractory block construction in accordance with conventional practice and, accordingly, will not be described further.

Situated in the sump or well 18 are a pair of stirrers 30 and 32, the stirrer 30 being closest to the right hand wall 14 and adapted for rotation in a clockwise direction, the stirrer 32 being adjacent the left side wall 15 and rotating in a counterclockwise direction. The details of the stirrer constructions are more clearly illustrated in FIG. 7 and will be explained hereafter. The stirrers 30 and 32 extend generally vertically down into the well or sump 18, but do not touch the bottom wall 23. The stirrers may be rotated by conventional drive means. With the forehearth construction as shown in FIG. 1 it will be appreciated that the molten glass will initially flow along the bottom wall section 12 in the direction indicated by arrow 13. The glass then flows downwardly over the front face 20 into the sump 18 where it passes generally along the bottom wall 23 underneath the skimmer plate 25 into contact with the stirrers 30 and 32. The glass is there mixed by the intermeshing action of the stirrers, while at the same time "bottom" glass is elevated. Finally, the glass moves downstream over the wall segment 12a. The skimmer plate 25 being vertically adjustable provides a considerable flexibility of operation in the controlling of flow conditions as they may exist from time to time. Where surface cords are non-existent and appreciable homogeneity already exists, the skimmer may be raised completely out of the molten stream. The skimmer may also be located so that its lowermost edge 25a is on a level with the bottom wall proper 12, whereby a mild surface cord or scum condition is effectively combated. Most preferably, of course, the overall advantages attendant the practice of this invention are achieved by the positioning of the skimmer 25 so that it projects down into the sump or well 18, whereby the normal flow of the glass is disrupted before encountering the mixing action of intermeshing plurality of stirrers.

The stirrers 30 and 32 are shown somewhat enlarged and therefore in more detail in FIG. 7, a description of which follows. Stirrer 30 includes a main vertical support shaft 31 and, additionally, a plurality of horizontal fins or blades 33 which are arranged in vertically spaced flights of which there are five shown. There are four fins in each flight and, as can be seen, each fin extends radially outwardly 90° disposed from its neighbor. In accordance with a preferred embodiment of the present invention, the fins 33 are slightly inclined or canted as shown, so that with reference to the clockwise rotation the leading edge 34 is lower than the trailing edge 35. This is shown most graphically in FIG. 8. The fins 33 of each flight are joined at their centers as at 36 which, in the case of the topmost flight, constitutes the connection with the support shaft 31 for the entire stirrer structure and also constitutes the axis of rotation. The outermost extremities 37 of the horizontal fins 33 in the same vertical plane are connected by a vertical deflector blade 39 of which there are four for each stirrer. The deflector blades 39 are inclined or canted in such a way that the leading edge thereof 40, taken in the direction of rotation, defines a circle which is larger in diameter than the circle defined by the trailing edge 41. This is shown most clearly in FIG. 9. The inclination of fins 33 and deflectors 39, as discussed, causes the glass on contact therewith to be urged inwardly by the deflectors 39 and upwardly by the horizontal fins 33. The stirrer 32 is similar in construction to the stirrer 30 except that the inclination of the fins and blades is in the opposite direction. Thus, since stirrer 32 rotates in a counterclockwise direction, the inclination is set so that the leading edge 34a of the horizontal fin member 33a is lower than the trailing edge 35a taken in the direction of rotation. In a similar manner, the leading edge 40a of the vertical deflector 39a describes a circle which is greater in diameter than the trailing edge 41a, both being taken with respect to the direction of travel. As a consequence, as the stirrer 32 rotates in a counterclockwise direction, the glass as contacted by the surfaces of the fins 33a and deflectors 39a having the construction and inclination described will tend to move the glass inwardly towards the axis of the shaft 31a and also upwardly. The inclination of the fins and deflectors may generally fall anywhere in the range of 0 to 45 degrees. Preferably, of course, the fins or deflectors, and preferably both, should be canted at least 2 or 3 degrees in order that the glass contacted thereby will be urged both inwardly (toward the axis of the stirrer) and upwardly. The selection of a particular degree of inclination or of the "attitude" of the fins and/or deflectors will be dependent upon the speed of rotation, and the viscosity of the glass involved. It has been determined that for the rotational speeds concerned in the practice of this invention and a glass of average viscosity, an inclination of about 18 to 20 degrees is most suitable and, therefore, preferred.

Since the stirrers are constantly immersed in a moving stream of molten glass, they must be fabricated to withstand elevated temperatures and as well the corrosive and erosive nature of the glass. To meet these conditions, the stirrers are formed of molybdenum (Mo) coated with a layer of alumina refractory and finally clad with platinum (Pt). The layer of alumina serves somewhat as an insulator or barrier precluding disassociation and a molecular exchange of the metals Mo and Pt. Furthermore, to provide additional strength, it may be desirable to have all the centers 36 of the fins 33 connected (not shown), thereby defining a central support coextensive with the shaft 31.

Reference may also be had to FIGS. 2 and 3 in which parts common to construction elements noted in FIG. 1 will bear like numbers. Thus, there is shown a channel 11 having a sump 18 formed therein and being particularly definitive of a depressed bottom wall 23 having an upstream face 20 and a downstream face 22. The vertically adjustable skimmer member 25 in the position shown (FIG. 3) serves to force the surface glass downward into the sump and therebeneath into the influence of the intermeshing pair of stirrers 30 and 32. Central shaft 31a of stirrer 32 carries a coaxial gear 47 connecting with gear 48, driven by a motor 49. A similar drive arrangement may be used for stirrer 30, or the gear 47 may connect with a similar gear (not shown) coaxially mounted on shaft 30a. The construction of the forehearth and stirrer arrangement as discussed thus far in connection with FIGS. 2 and 3 is essentially the same as that shown in FIG. 1. Most preferably, where the skimmer 25 does in fact project down into the sump, it is adjusted so that the distance between its lowermost edge 25a (FIG. 3) and the sump bottom 23 is somewhat less than the clearance between the skimmer bar rear face 25b and the upstream face 20 of the pump 18. The flow of the glass just downstream from the stirrers 30 and 32 and sump 18 is graphically represented by the dotted lines, identified by the reference letters L and L' in FIG. 2. As can be seen, a very small amount of glass L in the center is drawn upstream into the stirrers, while on either side of the center the glass flow L' proceeds radially outwardly.

FIGS. 2 and 3 also disclose a forehearth construction and stirrer arrangement in accordance with a further embodiment of the invention. In this embodiment the side walls 14 and 15 are flared outwardly downstream from the sump 18, as at 50, to define side walls 51 and 52 which are spaced apart a greater distance than the side walls 14 and 15 to accommodate four stirrers 53, 54, 55 and 56 positioned with their centers on a line extending perpendicularly between the side walls and with their radially extending fins 57 in intermeshing relationship. The stirrers 53 to 56 are of the same configuration as discussed hereinbefore in the description of FIG. 7. Preferably, the rotation of these stirrers is controlled such that the right hand stirrer 53 next to the right hand wall 51 and the stirrer 55 rotate clockwise, while the leftmost stirrer 56 next to the side wall 52 and stirrer 54 rotate counterclockwise. The stirrers 53 through 56 are rotated by actuation of motor 49a which rotates drive gears 48a and 47a, the latter being coaxially mounted on shaft 56a. Similar coaxial gears (not shown) on the shafts of the other stirrers are connected suitably to the drive arrangement. Where a plurality of stirrers is employed as here, it is preferable that the number thereof be even rather than odd. Furthermore, from the standpoint of defect elimination, it is most preferable that the stirrers be rotated so that (looking downstream) the rightmost one is rotating in a clockwise direction, whereby the leftmost stirrer will rotate counterclockwise, considering that adjacent stirrers must rotate oppositely since they are in intermeshing relationship. While it is not known with certainty why defect elimination is favored by this arrangement, it is suspected that a clockwise rotation of the leftmost stirrer defines a straight through flow path between it and the left wall, permitting cords, stones, and the like, to substantially by-pass the mixing action.

In order to achieve the optimum in mixing and homogenization of the glass, I have found that the stirrers, employing specific features of construction disclosed herein, in cooperation with the particular modified forehearth construction as disclosed herein, should be operated at a rotational speed of from about 3 to 12 revolutions per minute, with 5 revolutions per minute being most preferred. Of course, it must be recognized that allowances in this regard must be made for the viscosity of the glass and the angular inclination of the fins. The ranges set forth above envision a fin inclination of 18 degrees.

Care should be exercised in the employment of the stirrers in accordance with this invention. Thus, the glass level must not be allowed to drop to a level so low that the top flight of the stirrers is in contact with the glass surface since entrapment of air will undoubtedly occur leading to the formation of seeds, blisters, and the like. On the other hand, the stirrers may be vertically disposed so that one or more flights lie completely above the glass surface whereby mixing action can be reduced or increased as desired.

A construction representing another embodiment of the present invention is illustrated in FIG. 4, wherein there is disclosed a generally vertically disposed cylindrical vessel 59 which includes an inlet 60 in its upper regions and an outlet 61 controlled by a vertically shiftable plunger 62, which in its upward position allows molten glass M contained therein to fall out by force of gravity to form a gob G. A stirrer 63 is located within the chamber 59, the shaft 63a of which is journaled as at 64, and bears thereabove a pulley 65, secured as at 66, driven by a belt or chain 67 connected to a suitable motor, not shown, for effecting rotation of the stirrer 63 which is essentially identical in construction to either the stirrer 30 or stirrer 32 (FIGS. 1 and 3 to 5), excepting that it is composed of two or more, in this case four, flights of radially extending blades or fins rather than the five flights as hereinbefore discussed. The stirrer 63 is of a size that there is not too great a clearance C between the outer extremity of the blades 63b and the wall W of the chamber, whereby rotation of the stirrer is extremely effective in developing shearing forces and thereby homogenizing the glass passing downwardly through the vessel 59. The clearance should not be closer than ⅛ inch, otherwise blister formation will occur. The stirrer 63 as indicated may be so fabricated that its fins 63b are inclined in one direction as with stirrer 31 (FIG. 7), or the other direction as with stirrer 32. By the same token, the stirrer may be rotated in either direction since there is no cooperating intermeshing stirrer but rather a surrounding wall surface. Rotation will depend on the action desired. Thus, depending on the inclination of the fin elements and the rotation, the glass may be urged downwardly in a pump action or urged upwardly impeding the gravity-induced downward flow of glass. Variable control of the speed of rotation and the direction thus gives considerable flexibility which is desirable in adjusting flow rate to meet any given viscosity, temperature or composition condition, in relation to gob size requirements.

Reference may now be had to FIG. 5, wherein there is disclosed a channel or forehearth construction including a stirrer arrangement representing another embodiment of the present invention. A forehearth 70, generally similar to the forehearth 11 of FIG. 1, is modified to include a depressed sump portion 71, having an upstream face 72 and a downstream face 73 extending transversely between forehearth side walls 74 and 75. A depending skimmer plate 76 also transverses the side walls 72 and 73 just downstream from the face 72. The skimmer extends below the glass surface (not shown) but is short of the sump bottom wall 71a. The glass flow in the forehearth is from right to left, as indicated by the arrow 78. Four stirrers 79, 80, 81 and 82, identical in construction to the stirrers 30 and 32, extend down into the sump portion 71. Particularly, stirrers 79 and 81 are identical to the stirrer 30 as discussed in connection with FIG. 7 since they are arranged for rotation in a clockwise direction, while the stirrers 80 and 82 are identical in construction to the stirrer 32 since they are adapted for counterclockwise rotation in the assembly as shown. The stirrers are so arranged that their respective centers C constitute corners of a square located within the confines of the sump 71 as shown. The intersection of walls defining the sump are curvilinear, as at 83, so that the flow of the molten glass therewithin will be turbulence and eddy free.

Referring now to FIG. 6, there is shown another stirrer arrangement and modified forehearth construction representing a further embodiment of this invention. There is here disclosed a channel or forehearth 91 of given width defining a first zone. The channel is constructed to define flared opposed side wall portions 92, of greater width than at 91, on both sides of the channel and just downstream from the portion 91. These side wall portions 92 define therebetween a second zone of greater width than the first zone. The forehearth thereafter narrows in to a width (third zone) represented by the reference numeral 93. This third zone between the wall segments 93 is narrower than either one of zones 1 or 2. In the portion 92 of greatest channel width (zone 2) there is situated four stirrers 94, 95, 96 and 97 in intermeshing array on a line transversing the width of the channel. The stirrers 94 to 97 are identical to the stirrers 30 and 32, particularly having in mind the inclination of the fins and deflectors in terms of the rotation desired. Just downstream from the array of stirrers 94 through 97 and in the narrowest section 93 (zone 3) of the forehearth, there is positioned two additional stirrers 98 and 99. The stirrers 98 and 99 intermesh respectively with the stirrers 95 and 96. Stirrers 94, 96 and 98 rotate in a clockwise direction, while the stirrers 95, 97 and 99 rotate in a counterclockwise direction. The flow of the glass is such that the glass passes from zone 1 (defined between side walls at 91), then enters the array of four stirrers (zone 2) and then passes through the two stirrer arrangement at the same time as it is confined, in zone 3, by the channel width, identified by the reference numeral 93, whereby extremely effective homogenization and mixing of the flowing molten glass stream is effected.

The stirrers, which have been described hereinabove in conjunction with the several modified forehearth constructions, are preferably arranged in such proximity to each other that the radially extending fins or blades overlap or intermesh. By way of illustration, a stirrer construction and arrangement which has been used involved a spacing of two such stirrers so that their axial centers were 10 inches apart and their radially extending fins measured 7 inches. The stirrer diameter was thus 14 inches and the radial span was 7 inches. This set up provided a four inch overlapping of the outer portion of the radially extending fins. In another arrangement, the stirrers used had radially extending fins measuring 3¼ inches (a 6½ inch diameter stirrer) and they were spaced with their centers apart a distance of 5½ inches, giving an overlap of the outer portions of the fins of one inch. Actual employment of stirrers, as just above described, were found most effective in the practice of the invention. Accordingly, it is a feature of this invention that the stirrers should preferably be spaced apart a distance such that from about one-fourth to about one-half of the radial span (radius) of the fins of adjacent stirrers are in intermeshing or overlapping relationship.

Within the broader aspects of the present invention, it is not absolutely necessary to employ a sump or well depression for receiving the plurality of stirrers and in such case skimmers, diverters, dams, or the like, may be employed to provide the change in flow path just prior to the mixing zone. However, the sump or well feature is most desired and represents a preferred construction providing the best overall mixing and elimination of defects within the flowing molten glass stream in accoradnce with the primary object of the invention when combined with the other constructional features and apparatus herein disclosed.

It has been found that the forehearth constructions modified in accordance with the preferred embodiments of the present invention and employing the stirrer arrangement in accordance with the teachings herein have provided a very acceptable degree of homonegization of molten glass. This has been graphically illustrated by the fact that defects in terms of stones, striae, and the like, are at a minimum in operation employing such features of construction. Furthermore, actual practice of the invention as, for example, employing the arrangement and construction as illustrated in FIG. 1 and described herein revealed that molten glass having an average forehearth temperature of about 2200° F. experienced a drop in temperature of 130° F. in passing through the sump, mixing zone, etc. This drop was determined by noting the precise temperature just upstream of the sump and noting at the same time the precise temperature just downstream, both temperatures being taken by probes located identically with respect to the cross section of the moving steam. Such a temperature drop clearly indicates a high degree of mixing of the colder bottom glass with the hotter glass at the higher level.

Modification may be resorted to without departing from the spirit and scope of the present invention as defined in the appended claims.

I claim:
1. In combination a forehearth channel, for passage of molten glass therethrough, said forehearth including a first zone, second zone and third zone through which glass passes in sequence, said third zone being of less width than said first zone, said first zone being of less width than said second zone, said stirrers being arranged in said second zone in intermeshing relationship and sufficient in number to collectively span the width of said second zone, said stirrers each comprising a rotatable, vertically disposed support shaft, a plurality of radially etxending fins carried by said shaft and a plurality of vertical deflector elements carried by a plurality of said fins, said fins and deflectors being included on their respective axis in such manner that, with respect to a given direction of rotation, the leading edge of the fins lies in a lower plane than the trailing edge, and the leading edge of the deflector elements is radially outboard of the trailing edge.

2. The combination as claimed in claim 1, which includes another set of said stirrers in the third zone and spaced from the first mentioned plurality of stirrers a distance wherein the stirrers of the second set intermesh with the first-mentioned stirrers.

3. In combination,
a molten glass conveying forehearth channel composed of a bottom wall and marginally connected upstanding side walls, and
an even plurality of stirrer members located to extend downwardly into said channel in side-by-side transverse, intermeshing array, said stirrers each comprising:
a rotatable, vertically disposed support shaft,
a plurality of radially extending fins carried by said shaft and
a plurality of vertical deflector elements carried by a plurality of said fins,
said fins and deflectors being inclined on their respective axis in such manner that, with respect to a given direction of rotation, the leading edge of the fins lies in a lower plane than the trailing edge, and the leading edge of the deflector elements is radially outboard of the trailing edge.

4. The combination as claimed in claim 3, wherein the fins and deflectors are inclined on their respective axis to define an angle of 18°.

5. In combination,
- a molten glass conveying forehearth channel composed of a bottom wall and marginally connected upstanding side walls, said bottom wall including a sump-like depression extending laterally between said side walls, and
- an even plurality of laterally side-by-side stirrer members extending down into said sump depression, said stirrers each comprising:
- a rotatble, vertically disposed support shaft,
- a plurality of radially extending fins carried by said shaft and
- a plurality of vertical deflector elements carried by a plurality of said fins,
- said fins and deflectors being inclined on their respective axis in such manner that, with respect to a given direction of rotation, the leading edge of the fins lies in a lower plane than the trailing edge, and the leading edge of the deflector elements is radially outboard of the trailing edge.

6. The improved combination as claimed in claim 5, wherein said combination includes a skimmer plate projecting vertically downwardly into said sump depression but short of the bottom, said skimmer plate being located upstream with respect to said stirrers, said skimmer plate including a bottom edge spaced a distance from the bottom of the depression which is less than the distance between the skimmer and the upstream edge of said depression.

7. The combination as claimed in claim 5, which includes a second plurality of said stirrers arranged in transverse array spanning said channel downstream from said sump depression, said second plurality constituting a number of stirrers greater than in said first plurality located in said sump depression.

8. The combination as claimed in claim 5, wherein said side-by-side stirrer members are spaced apart a distance such that the radially extending fins overlap a distance which represents at least one-fourth of each fin's radial span.

9. In combination,
- a molten glass conveying forehearth channel composed of a bottom wall and marginally connected upstanding side walls, said bottom wall including a sump-like depression extending between said side walls, and
- two pair of laterally side-by-side stirrer members extending down into said sump depression, said stirrers each intermeshing with the adjacent stirrer and comprising:
- a rotatable, vertically disposed support shaft,
- a plurality of radially extendnig fins carried by said shaft,
- a plurality of vertical deflector elements carried by a plurality of said fins,
- said fins and deflectors being included on their respective axis in such manner that, with respect to a given direction of rotation, the leading edge of the fins lies in a lower plane than the trailing edge, and the leading edge of the deflector elements is radially outboard of the trailing edge, and
- means mounting said stirrer members with the support shaft substantially normal to said bottom wall.

References Cited by the Examiner
UNITED STATES PATENTS

| | | | |
|---|---|---|---|
| 1,723,620 | 8/1929 | Hottmann | 259—104 |
| 2,569,459 | 10/1951 | De Voe | 65—134 |
| 2,746,729 | 5/1956 | Eakins | 65—134 |
| 2,831,664 | 4/1958 | Spremulli | 65—178 X |
| 3,053,517 | 9/1962 | Penberthy. | |
| 3,057,175 | 10/1962 | Rough et al. | 65—178 |

DONALL H. SYLVESTER, *Primary Examiner.*